(12) United States Patent
Yang (10) Patent No.: US 11,681,601 B2
(45) Date of Patent: Jun. 20, 2023

(54) APPLICATION PROGRAM MANAGEMENT METHOD AND APPARATUS, AND STORAGE MEDIUM

(71) Applicant: ZTE Corporation, Shenzhen (CN)

(72) Inventor: Sihai Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 117 days.

(21) Appl. No.: 17/601,273

(22) PCT Filed: Aug. 24, 2020

(86) PCT No.: PCT/CN2020/110913
§ 371 (c)(1),
(2) Date: Oct. 4, 2021

(87) PCT Pub. No.: WO2021/047380
PCT Pub. Date: Mar. 18, 2021

(65) Prior Publication Data
US 2022/0164272 A1 May 26, 2022

(30) Foreign Application Priority Data
Sep. 9, 2019 (CN) .......................... 201910848494.1

(51) Int. Cl.
*G06F 9/44* (2018.01)
*G06F 11/34* (2006.01)
*G06F 9/448* (2018.01)

(52) U.S. Cl.
CPC ........ *G06F 11/3409* (2013.01); *G06F 9/4494* (2018.02)

(58) Field of Classification Search
CPC .................................................. G06F 11/3409
(Continued)

(56) References Cited

U.S. PATENT DOCUMENTS

| 11,374,903 B1 * | 6/2022 | Li ...................... H04L 63/0227 |
| 2014/0208328 A1 | 7/2014 | Chen |

(Continued)

FOREIGN PATENT DOCUMENTS

| CN | 105975348 A | 9/2016 |
| CN | 106201674 A | 12/2016 |

(Continued)

OTHER PUBLICATIONS

European Patent Office. Invitation Pursuant to Rule 63(1) EPC for EP Application No. 20862361.1, dated Apr. 26, 2022, pp. 1-4.

(Continued)

*Primary Examiner* — Timothy A Mudrick
(74) *Attorney, Agent, or Firm* — Vivacqua Crane, PLLC (57) ABSTRACT

An application program management method and apparatus, and a non-transitory computer-readable storage medium are disclosed. The application program management method may include: determining a current extra inspection policy for a target application program according to a current running type of the target application program in response to a determination that a freezing detection of the target application program is required; determining a current inspection policy corresponding to the target application program based on a basic inspection policy corresponding to the target application program and the current extra inspection policy; and freezing the target application program in response to a determination that a running state of the target application program satisfies the current inspection policy.

20 Claims, 4 Drawing Sheets

(58) Field of Classification Search
USPC .......................................................... 719/320
See application file for complete search history.

(56) References Cited

U.S. PATENT DOCUMENTS

| | | |
|---|---|---|
| 2014/0223437 A1 | 8/2014 | Chang et al. |
| 2019/0108329 A1* | 4/2019 | Yan ..................... G06F 21/45 |
| 2019/0362067 A1* | 11/2019 | Salehpour ............. G06F 21/566 |

FOREIGN PATENT DOCUMENTS

| | | |
|---|---|---|
| CN | 106708546 A | 5/2017 |
| CN | 106873749 A | 6/2017 |

OTHER PUBLICATIONS

International Searching Authority. International Search Report and Written Opinion for PCT Application No. PCT/CN2020/110913 and English translation, dated Nov. 30, 2020, pp. 1-10.

* cited by examiner

APPLICATION PROGRAM MANAGEMENT METHOD AND APPARATUS, AND STORAGE MEDIUM

CROSS-REFERENCE TO RELATED APPLICATION

This application is a national stage filing under 35 U.S.C. § 371 of international application number PCT/CN2020/110913, filed Aug. 24, 2020, which claims priority to Chinese patent application No. 201910848494.1, filed Sep. 9, 2019. The contents of these applications are incorporated herein by reference in their entirety.

TECHNICAL FIELD

Embodiments of the present application relate to the technical field of terminals, and more particularly, to an application program management method and apparatus, and a non-transitory computer-readable storage medium.

BACKGROUND

With the development of communication technology, terminal devices such as mobile phones are widely used. In order to improve the endurance of the terminal device and to reduce the waste of resources in the terminal device, freezing technology can be used to manage the application programs running on the terminal device.

Currently, an inspection policy can be configured for each application program or each type of application programs, so as to inspect whether the running state of the application programs satisfies the inspection policy when the time slice of the freezing inspection arrives. Freezing the target application program is performed when it is determined that the running state of the target application program satisfies the current inspection policy.

However, this freezing treatment may cause false freezing that affects the normal use of the application program when the application is running, and the user experience is degraded.

SUMMARY

Embodiments of the present application provide an application program management method and apparatus, and a non-transitory computer-readable storage medium.

Hence, an application program management method is provided by embodiments of the present application, which may include: determining a current extra inspection policy for a target application program according to a current running type of the target application program in response to a determination that a freezing detection of the target application program is required; determining a current inspection policy corresponding to the target application program based on a basic inspection policy corresponding to the target application program and the current extra inspection policy; and freezing the target application program in response to a determination that the running state of the target application program satisfies the current inspection policy.

An application management apparatus is provided by embodiments of the present application, which may include: a first determination module, configured to determine a current extra inspection policy for a target application program according to a current running type of the target application program in response to a determination that a freezing detection of the target application program is required; a second determination module, configured to determine a current inspection policy corresponding to the target application program, based on a basic inspection policy corresponding to the target application program and the current extra inspection policy; and a freezing module, configured to freeze the target application program in response to a determination that the running state of the target application program satisfies the current inspection policy.

A terminal device is provided by embodiments of the present application, which may include: one or more processors; and a memory, configured to store one or more programs; wherein the one or more programs, when executed by the one or more processors, cause the one or more processors to perform the application program management method of any one of the embodiments of the present application.

A non-transitory computer-readable storage medium provided by embodiments of the present application stores computer programs which, when executed by a processor, cause the processor to perform the application program management method of any one of the embodiments of the present application.

Further description of the above embodiments and other aspects of the present application and the implementing method are provided in the brief description of the drawings, detailed description, and claims.

DETAILED DESCRIPTION

In order to make the purpose, technical schemes and advantages of the present application more clearly, the embodiments of the present application will be described in detail below in conjunction with the accompanying drawings. It should be noted that the embodiments and the features in the embodiments of the present application can be arbitrarily combined with each other without conflict.

Currently, freezing technology can be used to manage application programs running on a terminal device to avoid unnecessary power consumption and security threats of the terminal device caused by the running application programs, thus improving the endurance and the security of the terminal device. In the current freezing technology, an inspection policy is configured for each application program or each type of application programs, which may cause false freezing when the application program is running and affects the normal use of the application program, thus degrading the user experience. For example, if the inspection policy is "non-current interface running" and an application program is executing a download task in the background, when a time slice of the freezing inspection arrives, it is determined that the application program satisfies the inspection policy "non-current interface running" according to the inspection policy, and therefore the application program is frozen. However, the application is actually executing a download task and the freezing of the application program causes the download task to be terminated, thus affecting the normal use of the application program by the user, and the user experience is poor.

Embodiments of the present application provide an application program management method, including: determining a current extra inspection policy matched with a current running type of a target application program according to the current running type of the target application program; determining a current inspection policy of the target application program based on a basic inspection policy of the target application program and the current extra inspection policy; and performing freezing detection on the target application program by using the current inspection policy. Thus, dynamically changing the current inspection policy according to the current running type of the target application program is achieved, and the false freezing caused by using the same inspection policy during the target application program running process is avoided. When the target application program is frozen, the normal operation of the target application program will not be affected. Thus, the user experience is improved.

Figure 1:
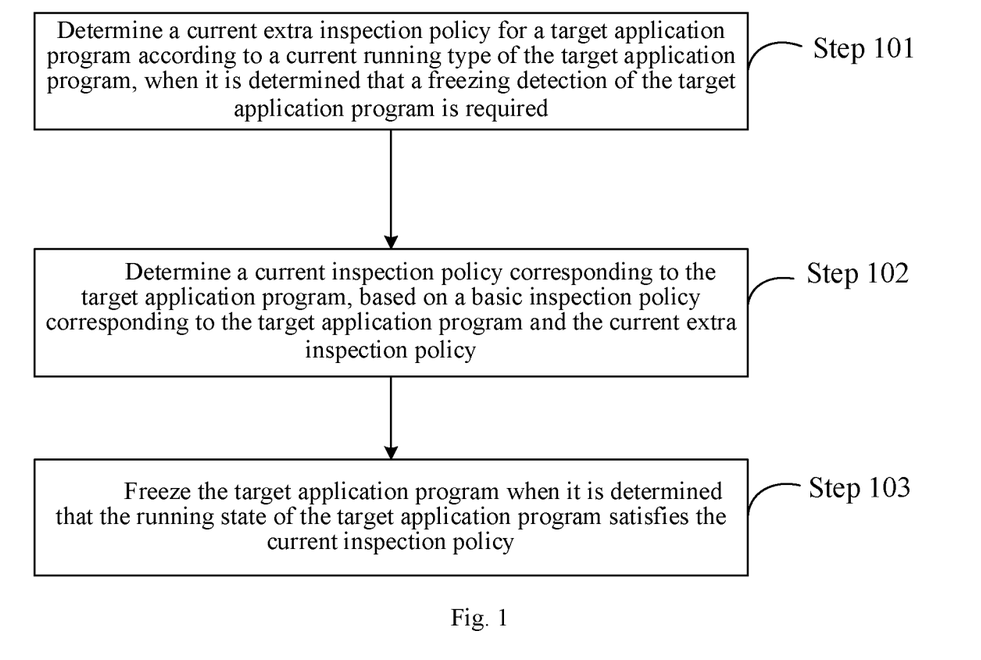
FIG. 1 is a flowchart of an application program management method in accordance with an embodiment.

FIG. 1 is a flowchart of the application program management method in accordance with an embodiment. This embodiment is applicable to scenarios where a terminal device freezes the application programs running thereon. This embodiment may be implemented by an application program management apparatus of the terminal device. The application program management apparatus of the terminal device may be implemented in the manner of software and/or hardware, and may be integrated in the terminal device. As shown FIG. 1, the application program management method provided by this embodiment further includes the following steps of S101, S102 and S103.

At step S101, a current extra inspection policy for a target application program is determined according to a current running type of the target application program when it is determined that a freezing detection of the target application program is required.

The terminal device in this embodiment may be a handheld device, a mobile terminal, a wearable device, a computing device, and various forms of User Equipment (UE), etc. In some examples, the terminal device in this embodiment may be a mobile phone using Android as an operating system.

Freezing in this embodiment refers to controlling the process of an application program to stop it from running, so as to prevent it from occupying resources such as the Central Processing Unit (CPU), sensors, Global Positioning System (GPS), and memory of the terminal device, and from consuming power. A frozen application program can be unfrozen to restore normal operation.

In some embodiments, the target application program includes any one or more other application programs running in the background that are not in the current interface when the terminal device is in a screen-on state.

In some embodiments, the target application program includes any one or more application programs when the terminal device is in a screen-off state.

In some embodiments, the target application program can be a user-specified application program.

In some embodiments, the target application program may be determined by the terminal device based on the user's historical habits of using the application. For example, the terminal device identifies application programs that are used less frequently than a preset frequency threshold as target application programs.

In an embodiment, the freezing detection is performed cyclically, i.e., a time interval is set for the freezing detection and the freezing detection is performed when the time slice of the freezing detection arrives.

In another embodiment, the user can trigger a command to perform freezing detection on the terminal device. For example, an icon on the terminal device indicating freezing detection can be clicked to trigger the freezing detection.

In this embodiment, each target application program corresponds to a basic inspection policy. The basic inspection policy can be specific to each target application program or a type of target application programs, i.e., the basic inspection policies of the same type of application programs are the same; or can be specific to a common inspection policy for all target application programs, i.e., all target application programs correspond to one same basic inspection policy. In some embodiments, the basic inspection policy can be user-configured or already configured in the factory settings. The basic inspection policy can also be a basic inspection policy matching the target application program and determined from multiple basic inspection policies during the freezing detection.

In this embodiment, a current inspection policy for a current frozen detection of the target application program is determined based on the basic inspection policy of the target application program and the current extra inspection policy determined for the current running type. The current extra inspection policy of the target application program matches the current running type of the target application program, i.e., matching the current extra inspection policy based on the current running type of the target application program is achieved, and thus determining the current inspection policy of the target application program based on the current running type of the target application program is achieved.

In an embodiment, a mapping relationship between the running type and the extra inspection policy is stored in the terminal device. When a current extra inspection policy for a target application program is determined according to a current running type of the target application program, the current extra inspection policy corresponding to the current running type is directly searched from the mapping relationship.

In another embodiment, whether a historical running type of the target application program from a previous freezing detection has disappeared is judged for the current freezing detection; whether the target application program has an additional running behavior is judged for the current freezing detection; and the current running type of the target application program and the current extra inspection policy are determined according to a judgment result. The specific process of the embodiment will be described in detail in the next embodiment.

In some embodiments, the current running type of the terminal device corresponds to the current running behavior of the terminal device. For example, assuming that the target application program is a reading application program, and at the time of a freezing detection, the reading application program is running a book-listening function, then for the current running behavior, a corresponding current running type can be music. The current running behavior can be triggered by the user, or can be a running behavior of the target application program when the target application program automatically executes a pre-defined function or program.

At step S102, a current inspection policy corresponding to the target application program is determined based on the basic inspection policy corresponding to the target application program and the current extra inspection policy.

After the current extra inspection policy is determined, a current inspection policy corresponding to the target application program is determined based on the basic inspection policy corresponding to the target application program and the current extra inspection policy.

In an embodiment, the basic inspection policy includes an inspection policy common to all application programs and a default inspection policy for a default running state of the target application program. An updated current extra inspection policy needs to be determined based on an inclusion relationship between the current extra inspection policy and the default inspection policy. Then, a union set of the inspection policy common to all application programs and the current extra inspection policy after updating is determined as the current inspection policy corresponding to the target application program.

When the current extra inspection policy includes the default inspection policy, the updated current extra inspection policy is determined as the current extra inspection policy. When the default inspection policy includes the current extra inspection policy, the updated current extra inspection policy is determined as the default inspection policy. When there is no inclusion relationship between the current extra inspection policy and the default inspection policy, the updated current extra inspection policy is determined as the union set of the current extra inspection policy and the default inspection policy.

In another embodiment, the basic inspection policy includes the inspection policy common to all application programs. The union set of the inspection policy common to all application programs and the current extra inspection policy is determined as the current inspection policy corresponding to the target application program.

In yet another embodiment, regardless of the embodiment of the basic inspection policy, the union set of the inspection policy common to all application programs and the current extra inspection policy is determined as the current inspection policy corresponding to the target application program.

It should be noted that the inspection policy in this embodiment may include sub-policies, and the union set of two inspection policies in this embodiment means that sub-policies in the two inspection policies are combined, and duplicate sub-policies are counted as only one sub-policy. This is similar to the concept of the union in the set. For example, if an inspection policy A includes no download task and non-current interface, and an inspection policy B includes no song-switching task, no download task and non-current interface, then the union set of the inspection policy A and the inspection policy B includes no download task, non-current interface and no song-switching task.

At step S103, the target application program is frozen if it is determined that the running state of the target application program satisfies the current inspection policy.

After the current inspection policy corresponding to the target application program is determined, the target application program is frozen if it is determined that the running state of the target application program satisfies the current inspection policy.

Furthermore, in this embodiment, the frozen target application program can be unfrozen. In some embodiments, the user can trigger a command to perform unfreezing operation on the terminal device. For example, an icon on the terminal device indicating an unfreezing detection can be clicked to trigger the unfreezing operation.

Figure 2:
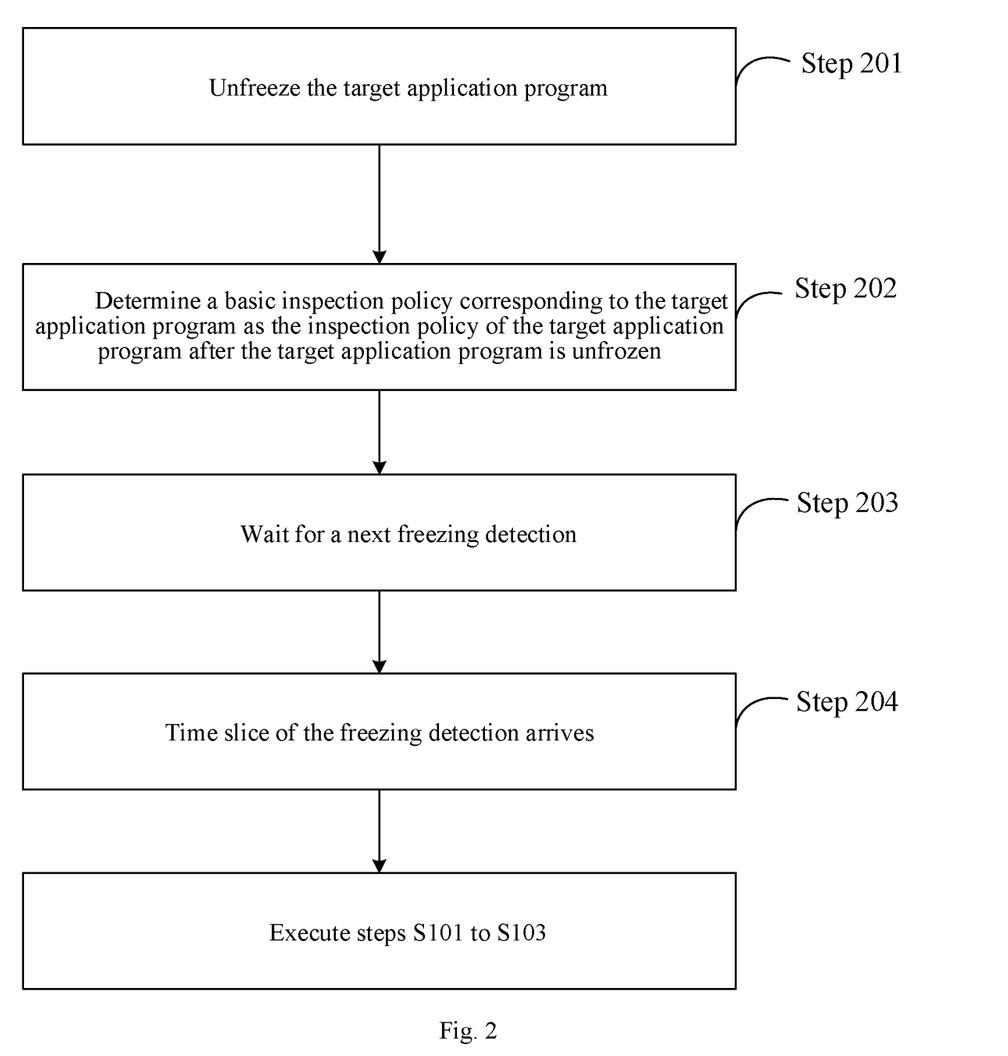
FIG. 2 is a schematic flowchart diagram of a process after a target application program is frozen in accordance with the embodiment in FIG. 1.

FIG. 2 is a schematic flowchart diagram of a process after the target application program is frozen in accordance with the embodiment in FIG. 1. As shown in FIG. 2, the process after the target application program is frozen includes the following steps of S201, S202, S203 and S204.

At step S201, the target application program is unfrozen.

The target application program is unfrozen if it is determined that unfreezing the target application program is required.

At step S202, a basic inspection policy corresponding to the target application program is determined as an inspection policy of the target application program after the target application program is unfrozen.

At step S203, a next freezing detection is waited for.

At step S204, steps S101 to S103 are executed when a time slice of the freezing detection arrives.

The following is a specific example to illustrate the freezing detection and the process after unfreezing in this embodiment.

Assuming that the target application program is a navigation application program, and a corresponding basic inspection policy includes: no change in displacement and non-current interface. When it is determined that the freezing detection is determined, and the target application program is in an updated state at this time, a current running type is a download application, and a corresponding current extra inspection policy includes: no download task. According to the basic inspection policy and the current extra inspection policy, a current inspection policy corresponding to the target application program is determined to include no change in displacement, non-current interface, and no download task. Then, the target application program is subjected to the freezing detection based on the current inspection policy. For example, the target application program is frozen if it is determined that the current running state satisfies no change in displacement, non-current interface, and no download tasks. The basic inspection policy corresponding to the target application program is determined as the inspection policy after the target application program is unfrozen if it is determined that unfreezing the target application program is required. Steps S101 to S103 will be executed when it is determined that a next freezing detection is required. The above process avoids false freezing when freezing the target application program.

The application program management method provided by embodiments of the present application includes: determining the current extra inspection policy for the target application program according to the current running type of the target application program when it is determined that a freezing detection of the target application program is required; determining the current inspection policy corresponding to the target application program based on the basic inspection policy corresponding to the target application program and the current extra inspection policy; and freezing the target application program when it is determined that the running state of the target application program satisfies the current inspection policy. Thus, a dynamic changing of the current inspection policy according to the current running type of the target application program is achieved. On one hand, the false freezing caused by using the same inspection policy during running of the target application program is avoided, and the normal operation of the target application program will not be affected when the target application program is frozen, thus the user experience is improved; and on the other hand, the efficiency and accuracy of the freezing execution is guaranteed.

Figure 3:
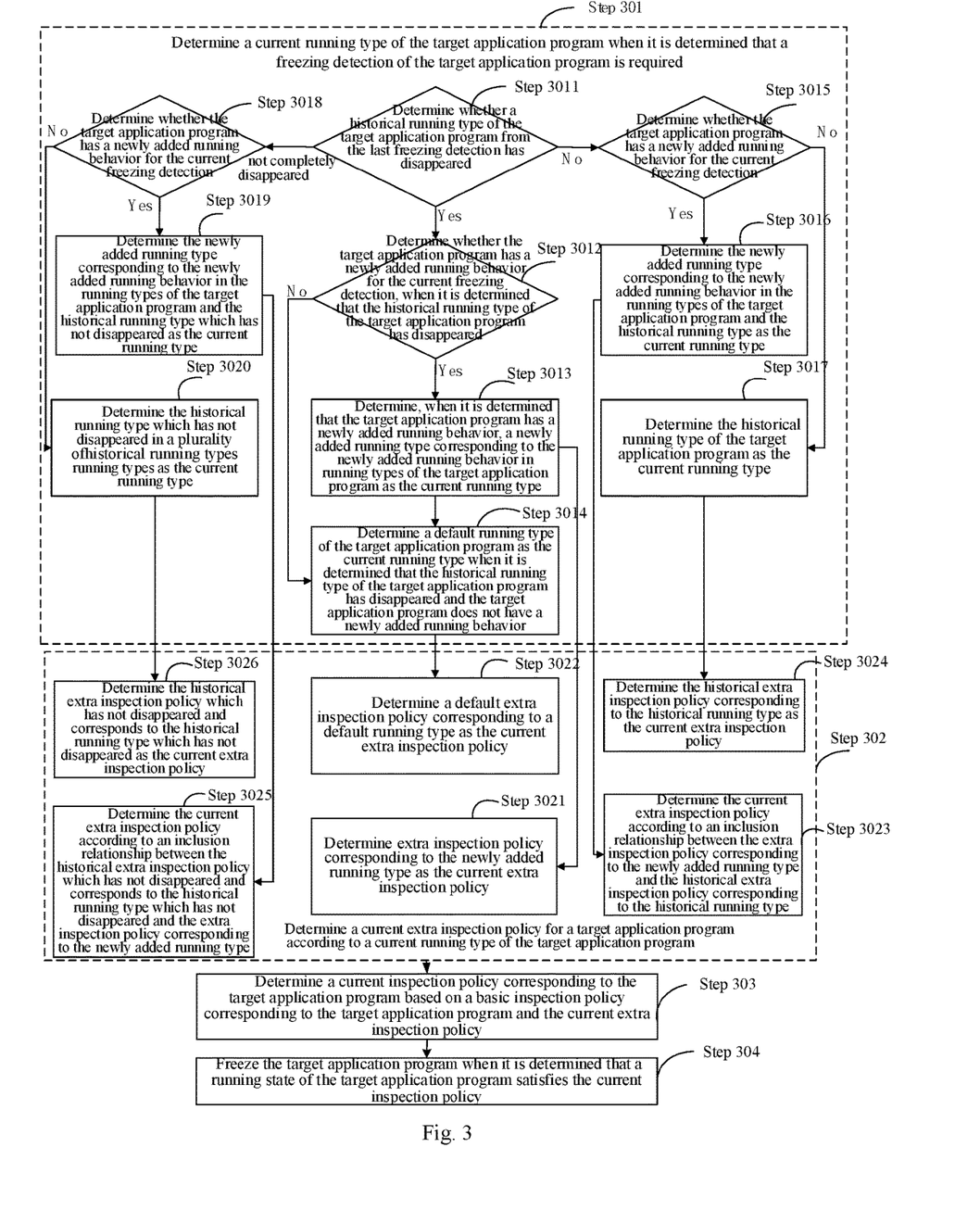
FIG. 3 is a flowchart of the application program management method in accordance with another embodiment.

FIG. 3 is a flowchart of the application program management method in accordance with another embodiment. This embodiment provides a detailed description of how to determine a current running type of a target application program and a process of implementing a current extra inspection policy based on the embodiment in FIG. 1. As shown in FIG. 3, the application program management method provided by this embodiment includes the following steps of S301, S302, S303 and S304.

At step S301, the current running type of the target application program is determined when it is determined that a freezing detection of the target application program is required.

For different scenarios, the step S301 includes the following steps of S3011 to S3020.

At step S3011, whether a historical running type of the target application program from a previous freezing detection has disappeared is determined.

At step S3012, whether the target application program has a newly added running behavior is determined for the current freezing detection when it is determined that the historical running type of the target application program has disappeared.

It should be noted that the newly added running behavior can be triggered by a user or added when the target application program automatically executes a pre-defined function or program. For example, for a reading application program, when the user clicks on a "listening" icon, the application program enters a book audio playback function, and the newly added running behavior refers to the playback behavior, which is triggered by the user. In another example, when an update need is detected, the reading application program downloads an update file. The newly added running behavior refers to the download behavior, which is automatically executed by the target application program.

At step S3013, a newly added running type corresponding to the newly added running behavior in running types of the target application program is determined as the current running type when it is determined that the target application program has an additional running behavior.

At step S3014, default running type of the target application program is determined as the current running type when it is determined that the historical running type of the target application program has disappeared and the target application program does not have a newly added running behavior.

At step S3015, whether the target application program has a newly added running behavior is determined for the current freezing detection when it is determined that the historical running type of the target application program has not disappeared.

At step S3016, when it is determined that the target application program has a newly added running behavior, the newly added running type corresponding to the newly added running behavior in the running types of the target application program and the historical running type are determined as the current running type.

At step S3017, the historical running type of the target application program is determined as the current running type when it is determined that the historical running type of the target application program has not disappeared, and the target application program does not have a newly added running behavior.

At step S3018, whether the target application program has a newly added running behavior is determined for the current freezing detection when it is determined that the historical running type of the target application program has not completely disappeared.

At step S3019, when it is determined that the target application program has a newly added running behavior, the newly added running type corresponding to the newly added running behavior in the running types of the target application program is determined as the current running type, and the historical running type which has not disappeared is determined as the current running type.

At step S3020, the historical running type which has not disappeared in the historical running types is determined as the current running type when it is determined that the target application program does not have a newly added running behavior.

At step S302, the current extra inspection policy for the target application program is determined according to the current running type of the target application program.

Based on the embodiment of step S301 above, the specific implementation process of step S302 is shown below.

Regarding step S3013, step S3021 includes determining the extra inspection policy corresponding to the newly added running type as the current extra inspection policy.

Regarding step 3014, step S3022 includes determining a default extra inspection policy corresponding to a default running type as the current extra inspection policy.

Regarding step 3016, step S3023 includes determining the current extra inspection policy according to an inclusion relationship between the extra inspection policy corresponding to the newly added running type and a historical extra inspection policy corresponding to the historical running type.

Step S3023 may include: determining the extra inspection policy corresponding to the newly added running type as the current extra inspection policy if the extra inspection policy corresponding to the newly added running type includes the historical extra inspection policy; determining a union set of the extra inspection policy corresponding to the newly added running type and the historical extra inspection policy as the current extra inspection policy if the extra inspection policy corresponding to the newly added running type does not include the historical extra inspection policy; and determining the historical extra inspection policy as the current extra inspection policy if the historical extra inspection policy includes the extra inspection policy corresponding to the newly added running type.

Regarding step S3017, step S3024 includes determining the historical extra inspection policy corresponding to the historical running type as the current extra inspection policy.

Regarding step S3019, step S3025 includes determining the current extra inspection policy according to the inclusion relationship between the historical extra inspection policy which has not disappeared and corresponds to the historical running type which has not disappeared and the extra inspection policy corresponding to the newly added running type.

Regarding step S3020, step S3026 includes determining the historical extra inspection policy which has not disappeared and corresponds to the historical running type which has not disappeared as the current extra inspection policy.

The process of step S301 and step S302 will be described below with an example. Assuming that the historical running type of the target application program before this detection is download, the current running type of the target application program for the current freezing detection can be the following four cases: 1. download and playback, 2. playback, 3. default, and 4. still download. The playback is the newly added running type corresponding to the newly added running behavior. Step S3013 corresponds to a second case, where step S3023 is: determining the extra inspection policy corresponding to the playback as the current extra inspection policy. Step S3014 corresponds to a third case. Step S3016 corresponds to a first case. In the first case, step S3023 includes: determining the current extra inspection policy according to the inclusion relationship between the extra inspection policy corresponding to the playback and the historical extra inspection policy corresponding to the download. Step S3017 corresponds to a fourth case.

In another example, assuming that the historical running type of the target application program before this detection is download and playback, the current running type of the target application program for the current freezing detection can be the following eight cases: 1. playback; 2. download; 3. default; 4. cache; 5. playback, download, and cache; 6. playback and cache; 7. download and cache; and 8. still download and playback. Step S3013 corresponds to the fourth case. Step S3014 corresponds to the third case. Step S3016 corresponds to a fifth case. Step S3017 corresponds to an eighth case. Step S3019 corresponds to a sixth case and a seventh case. Step S3020 corresponds to the first case and the second case.

At step S303, the current inspection policy corresponding to the target application program is determined based on the basic inspection policy corresponding to the target application program and the current extra inspection policy.

At step S304, the target application program is frozen when it is determined that the running state of the target application program satisfies the current inspection policy.

In terms of implementation process and technical principles, step S303 is similar to step S102, and step S304 is similar to step S103. Therefore, step S303 and step S304 will not be repeated here.

The application program management method provided by this embodiment includes: determining the current running type of the target application program based on the historical running type of the target application program and whether the target application program has a newly added running behavior for the current freezing detection; and determining the current extra inspection policy. Thus, the current extra inspection policy for the target application program can be precisely determined, the accuracy of the current inspection policy is further improved, and the running of the target application being affected by false freezing is avoided. Therefore, the user experience is improved.

Figure 4:
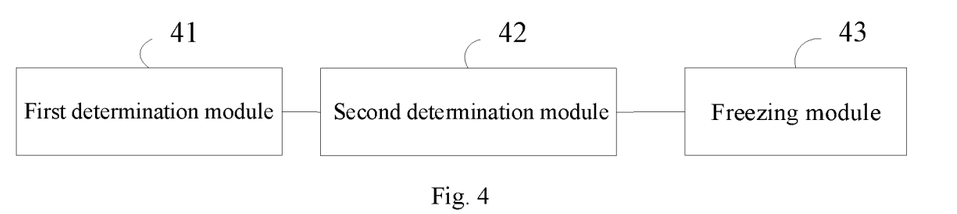
FIG. 4 is a schematic structural diagram of an application program management apparatus in accordance with an embodiment.

FIG. 4 is a schematic structural diagram of an application program management apparatus in accordance with an embodiment. As shown in FIG. 4, the application program management apparatus provided by this embodiment includes a first determination module 41, a second determination module 42, and a freezing module 43.

The first determination module 41 is configured to determine a current extra inspection policy for a target application program according to a current running type of the target application program when it is determined that a freezing detection of the target application program is required.

The second determination module 42 is configured to determine a current inspection policy corresponding to the target application program based on a basic inspection policy corresponding to the target application program and the current extra inspection policy.

The freezing module 43 is configured to freeze the target application program when it is determined that a running state of the target application program satisfies the current inspection policy.

In some embodiments, the apparatus further includes a fourth determination module configured to determine the basic inspection policy corresponding to the target application program as an inspection policy after the target application program is unfrozen when it is determined that unfreezing the target application program is required.

The application program management apparatus provided by this embodiment is configured to implement the application management method of the embodiment in FIG. 1. The application management apparatus provided by this embodiment has similar implementing principles and technical effects, which are not repeated here.

Figure 5:
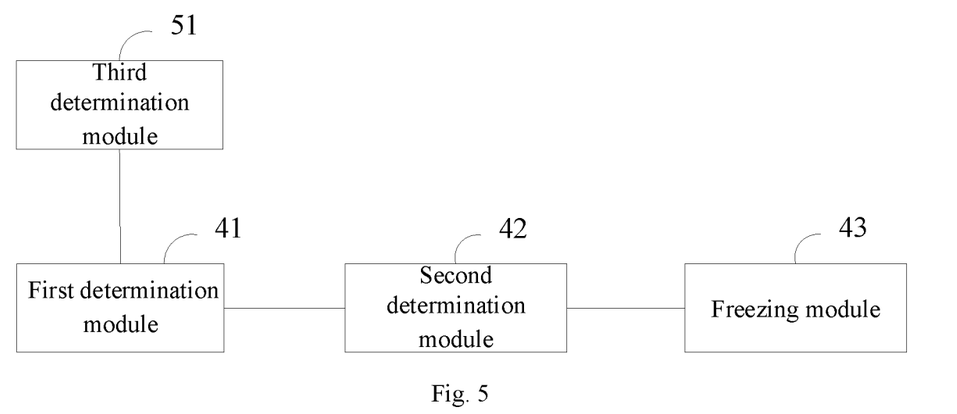
FIG. 5 is a schematic structural diagram of the application program management apparatus in accordance with another embodiment.

FIG. 5 is a schematic structural diagram of the application program management apparatus in accordance with another embodiment. This embodiment provides a detailed description of other modules of the application program management apparatus based on the embodiment in FIG. 4. As shown in FIG. 5, the application program management apparatus provided by this embodiment further includes a third determination module 51.

The third determination module 51 is configured to determine a current running type of the target application program.

In some embodiments, the third determination module 51 is configured to determine whether a historical running type of the target application program from a previous freezing detection has disappeared; determine whether the target application program has a newly added running behavior for a current freezing detection when it is determined that the historical running type of the target application program has disappeared; and when it is determined that the target application program has a newly added running behavior, determine a newly added running type corresponding to the newly added running behavior in running types of the target application program as the current running type.

Correspondingly, the first determination module 41 is configured to determine an extra inspection policy corresponding to the newly added running type as a current extra inspection policy.

In some embodiments, the third determination module 51 is further configured to determine a default running type of the target application program as the current running type, when it is determined that the historical running type of the target application program has disappeared and the target application program does not have a newly added running behavior.

Correspondingly, the first determination module 41 is configured to determine a default extra inspection policy corresponding to the default running type as the current extra inspection policy.

In some embodiments, the third determination module 51 is further configured to determine whether the target application program has a newly added running behavior for the current freezing detection when it is determined that the historical running type of the target application program has not disappeared; and when it is determined that the target application program has a newly added running behavior, determine a newly added running type corresponding to the newly added running behavior in the running types of the target application program and the historical running type as the current running type.

Correspondingly, the first determination module 41 is configured to determine the current extra inspection policy according to an inclusion relationship between the extra inspection policy corresponding to the newly added running type and the historical extra inspection policy corresponding to the historical running type.

In some embodiments, in determining the current extra inspection policy according to the inclusion relationship between the extra inspection policy corresponding to the newly added running type that corresponds to the newly added running behavior and the historical extra inspection policy corresponding to the historical running type, the first determination module 41 is configured to: determine the extra inspection policy corresponding to the newly added running type as the current extra inspection policy if the extra inspection policy corresponding to the newly added running type includes the historical extra inspection policy; determine a union set of the extra inspection policy corresponding to the newly added running type and the historical extra inspection policy as the current extra inspection policy if the extra inspection policy corresponding to the newly added running type does not include the historical extra inspection policy; and determine the historical extra inspection policy as the current extra inspection policy if the historical extra inspection policy includes the extra inspection policy corresponding to the newly added running type.

In some embodiments, the third determination module 51 is further configured to: determine the historical running type of the target application program as the current running type when it is determined that the historical running type of the target application program has not disappeared, and the target application program does not have a newly added running behavior.

Correspondingly, the first determination module 41 is configured to determine the historical extra inspection policy corresponding to the historical running type as the current extra inspection policy.

In some embodiments, the third determination module 51 is further configured to: determine whether the target application program has a newly added running behavior for the current freezing detection when it is determined that the historical running type of the target application program has not completely disappeared; and when it is determined that the target application program has a newly added running behavior, determine a newly added running type corresponding to the newly added running behavior in the running types of the target application program and the historical running type which has not disappeared in the historical running types as the current running type.

Correspondingly, the first determination module 41 is configured to determine the current extra inspection policy according to an inclusion relationship between the historical extra inspection policy which has not disappeared and corresponding to the historical running type which has not disappeared and the extra inspection policy corresponding to the newly added running type.

In some embodiments, the third determination module 51 is further configured to: determine the historical running type which has not disappeared in the historical running types as the current running type when it is determined that the historical running type of the target application program has not completely disappeared, and the target application program does not have a newly added running behavior.

Correspondingly, the first determination module 41 is configured to determine the historical extra inspection policy which has not disappeared and corresponds to the historical running type which has not disappeared as the current extra inspection policy.

The application program management apparatus provided by this embodiment is configured to implement the application management method of the embodiment in FIG. 3. The application management device provided by this embodiment has similar implementing principles and technical effects, which are not repeated here.

Figure 6:
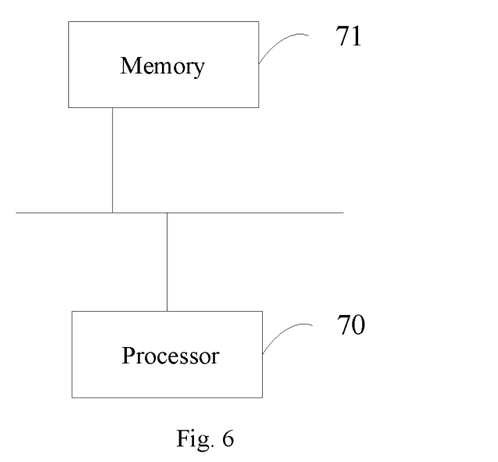
FIG. 6 is a schematic structural diagram of a terminal device in accordance with an embodiment.

FIG. 6 is a schematic structural diagram of the terminal device in accordance with an embodiment. As shown in FIG. 6, the terminal device includes a processor 70 and a memory 71. The number of the processor 70 in the terminal device may be one or more, and in FIG. 6, one processor 70 is taken as an example for description; the processor 70 and the memory 71 of the terminal device may be connected via a bus or other means, and in FIG. 6, bus connection is taken as an example for description.

The memory 71, as a non-transitory computer-readable storage medium, can be used to store software programs, computer-executable programs, and modules, such as program instructions corresponding to the application program management method in the embodiments of the present application, and modules (e.g., the first determination module 41, the second determination module 42, and the freezing module 43 in the application program management apparatus). The processor 70 performs various functional applications and data processing of the terminal device, i.e., implementing the application program management method described above, by running software programs, instructions, and modules stored in the memory 71.

The memory 71 may primarily include a program-storing area and a data-storing area. The program-storing area may store an operating system and an application program required for at least one function, and the data-storing area may store data created according to the use of the terminal device, etc. In addition, the memory 71 may include high-speed random access memory, and non-volatile memory, such as at least one disk memory device, a flash memory device, or other non-volatile solid-state memory devices. In some embodiments, the memory 71 may further include memories that are remotely located relative to the processor 70, and these remote memories may be connected to the terminal device via a network including, but are not limited to, the Internet, an intranets, a local area network, a mobile communication network, and combinations thereof.

Embodiments of the present application also provide a non-transitory computer-readable storage medium including computer-executable instructions, and the computer-executable instructions, when executed by a computer processor, cause the processor to perform an application program management method. The method includes:

determining a current extra inspection policy for a target application program according to a current running type of the target application program when it is determined that a freezing detection of the target application program is required;

determining a current inspection policy corresponding to the target application program based on a basic inspection policy corresponding to the target application program and the current extra inspection policy; and freezing the target application program when it is determined that a running state of the target application program satisfies the current inspection policy.

Certainly, embodiments of the present application also provide a non-transitory computer-readable storage medium containing computer-executable instructions which are not limited to performing the aforementioned operations of the method, but may also perform relevant operations in the application program management method provided in any of the embodiments of the present application.

According to the application program management method and apparatus, and the non-transitory computer-readable storage medium provided by the present application, on the one hand, false freezing caused by using the same inspection policy during running of the target application program is avoided, and the normal operation of the target application program will not be affected when the target application program is frozen, thus the user experience is improved; on the other hand, the efficiency and accuracy of freezing execution is guaranteed. The foregoing is illustrative of only a number of embodiments of the present application, and is not intended to limit the scope of protection of the present application.

In general, multiple embodiments of the present application can be implemented in hardware or dedicated circuitry, software, logic, or any combination thereof. For example, some aspects may be implemented in hardware, while other aspects may be implemented in firmware or software that can be executed by a controller, a microprocessor, or other computing devices, although the present application is not limited thereto.

Embodiments of the present application can be implemented by a data processor of a mobile device executing computer program instructions, for example, in a processor entity, or by hardware, or by a combination of software and hardware. The computer program instructions may be assembly instructions, instruction set architecture (ISA) instructions, machine instructions, machine-related instructions, microcode, firmware instructions, state setting data, or source or object code written in any combination of one or more programming languages.

Any block diagram of the logic flow in the accompanying drawings of the present application may represent program steps, or may represent interconnected logic circuits, modules, and functions, or may represent a combination of program steps and logic circuits, modules, and functions. Computer programs can be stored on the memory. The memory can be of any type suitable for the local technical environment and can be implemented by using any suitable data storage technology, such as, but not limited to, read-only memory (ROM), random access memory (RAM), optical memory devices and systems (Digital Versatile Disc DVD or CD), and the like. The computer-readable media may include a non-transitory storage media. Data processors can be of any type suitable for the local technology environment, such as, but not limited to, a general purpose computer, a special purpose computer, a microprocessor, a digital signal processor (DSP), an application specific integrated circuit (ASIC), a programmable logic devices (FGPA), and processors based on multi-core processor architectures.

By way of exemplary and non-limiting examples, a detailed description of several embodiments of the present application has been provided above. However, when considered in conjunction with the accompanying drawings and claims, a variety of modifications and adaptations to the above embodiments will be obvious to those having ordinary skills in the art without departing from the scope of the present application. Therefore, the proper scope of the present application will be defined by the claims.

What is claimed is:

1. An application program management method, comprising:
    determining a current extra inspection policy for a target application program according to a current running type of the target application program in response to a determination that a freezing detection of the target application program is required;
    determining a current inspection policy corresponding to the target application program based on a basic inspection policy corresponding to the target application program and the current extra inspection policy; and
    freezing the target application program in response to a determination that a running state of the target application program satisfies the current inspection policy.

2. The method of claim 1, prior to the step of determining a current extra inspection policy for a target application program according to a current running type of the target application program, further comprising:
    determining a current running type of the target application program.

3. The method of claim 2, wherein determining a current running type of the target application program comprises:
    determining whether a historical running type of the target application program from a previous freezing detection has disappeared;
    determining whether the target application program has a newly added running behavior for the current freezing detection in response to a determination that the historical running type of the target application program has disappeared; and
    determining, in response to a determination that the target application program has a newly added running behavior, a newly added running type corresponding to the newly added running behavior in a plurality of running types of the target application program as the current running type.

4. The method of claim 3, further comprising:
    determining a default running type of the target application program as the current running type in response to a determination that the historical running type of the target application program has disappeared and the target application program does not have a newly added running behavior.

5. The method of claim 3, further comprising:
    determining whether the target application program has a newly added running behavior for the current freezing detection in response to a determination that the historical running type of the target application program has not disappeared; and
    determining, in response to a determination that the target application program has a newly added running behavior, a newly added running type corresponding to the newly added running behavior in the plurality of running types of the target application program and the historical running type as the current running type.

6. The method of claim 5, further comprising:
    determining the historical running type of the target application program as the current running type in response to a determination that the historical running type of the target application program has not disappeared, and the target application program does not have a newly added running behavior.

7. The method of claim 3, further comprising:
    determining whether the target application program has a newly added running behavior for the current freezing detection in response to a determination that the historical running type of the target application program has not completely disappeared;
    determining, in response to a determination that the target application program has a newly added running behavior, a newly added additional running type corresponding to the newly added run behavior in the plurality of running types of the target application program and the historical running type which has not disappeared in a plurality of historical running types as the current running type; and determining the historical running type which has not disappeared in the plurality of historical running types as the current running type in response to a determination that the target application program does not have a newly added running behavior.

8. The method of claim 3, wherein determining a current extra inspection policy for a target application program according to a current running type of the target application program comprises:

determining an extra inspection policy corresponding to the newly added running type as the current extra inspection policy.

9. The method of claim 4, wherein determining a current extra inspection policy for a target application program according to a current running type of the target application program comprises:

determining a default extra inspection policy corresponding to the default running type as the current extra inspection policy.

10. The method of claim 5, wherein determining a current extra inspection policy for a target application program according to a current running type of the target application program comprises:

determining the current extra inspection policy according to an inclusion relationship between the extra inspection policy corresponding to the newly added running type and a historical extra inspection policy corresponding to the historical running type.

11. The method of claim 10, wherein determining the current extra inspection policy according to an inclusion relationship between the extra inspection policy corresponding to the newly added running type that corresponds to the newly added running behavior and a historical extra inspection policy corresponding to the historical running type, comprises:

determining the extra inspection policy corresponding to the newly added running type as the current extra inspection policy in response to the extra inspection policy corresponding to the newly added running type comprising the historical extra inspection policy;

determining a union set of the extra inspection policy corresponding to the newly added running type and the historical extra inspection policy as the current extra inspection policy in response to the extra inspection policy corresponding to the newly added running type not comprising the historical extra inspection policy; and determining the historical extra inspection policy as the current extra inspection policy in response to the historical extra inspection policy comprising the extra inspection policy corresponding to the newly added running type.

12. The method of claim 1, after the step of freezing the target application program, further comprising:

determining, in response to a determination that unfreezing the target application program is required, the basic inspection policy corresponding to the target application program as an inspection policy after the target application program is unfrozen.

13. An application program management apparatus, comprising:

a first determination module, configured to determine a current extra inspection policy for a target application program according to a current running type of the target application program in response to a determination that a freezing detection of the target application program is required;

a second determination module, configured to determine a current inspection policy corresponding to the target application program based on a basic inspection policy corresponding to the target application program and the current extra inspection policy; and a freezing module, configured to freeze the target application program in response to a determination that a running state of the target application program satisfies the current inspection policy.

14. A terminal device, comprising:

one or more processors; and a memory, configured to store one or more programs; wherein the one or more programs, when executed by the one or more processors, cause the one or more processors to perform an application program management method, the application program management method comprising:

determining a current extra inspection policy for a target application program according to a current running type of the target application program in response to a determination that a freezing detection of the target application program is required;

determining a current inspection policy corresponding to the target application program based on a basic inspection policy corresponding to the target application program and the current extra inspection policy; and freezing the target application program in response to a determination that a running state of the target application program satisfies the current inspection policy.

15. A non-transitory computer-readable storage medium, storing computer programs which, when executed by a processor, cause the processor to perform the application program management method of claim 1.

16. The method of claim 2, after the step of freezing the target application program, further comprising:

determining, in response to a determination that unfreezing the target application program is required, the basic inspection policy corresponding to the target application program as an inspection policy after the target application program is unfrozen.

17. The method of claim 3, after the step of freezing the target application program, further comprising:

determining, in response to a determination that unfreezing the target application program is required, the basic inspection policy corresponding to the target application program as an inspection policy after the target application program is unfrozen.

18. The method of claim 4, after the step of freezing the target application program, further comprising:

determining, in response to a determination that unfreezing the target application program is required, the basic inspection policy corresponding to the target application program as an inspection policy after the target application program is unfrozen.

19. The method of claim 5, after the step of freezing the target application program, further comprising:

determining, in response to a determination that unfreezing the target application program is required, the basic inspection policy corresponding to the target application program as an inspection policy after the target application program is unfrozen.

20. The method of claim 6, after the step of freezing the target application program, further comprising:
   determining, in response to a determination that unfreezing the target application program is required, the basic inspection policy corresponding to the target application program as an inspection policy after the target application program is unfrozen.

\* \* \* \* \*